United States Patent

[11] 3,586,275

| [72] | Inventors | Robert A. Mittelstadt<br>Burnsville;<br>Heinrich F. Tetzlaff, St. Paul, both of, Minn. |
|---|---|---|
| [21] | Appl. No. | 757,254 |
| [22] | Filed | Sept. 4, 1968 |
| [45] | Patented | June 22, 1971 |
| [73] | Assignee | Toro Manufacturing Corporation<br>Minneapolis, Minn. |

[54] CORD CONTROL
2 Claims, 7 Drawing Figs.

[52] U.S. Cl................................................ 248/52
[51] Int. Cl................................................. F16l 3/00
[50] Field of Search........................................ 248/51, 52

[56] References Cited
UNITED STATES PATENTS
2,557,534  6/1951  Cowles.................. 15/250.12 X
2,690,892  10/1954  La Bar..................... 248/52

*Primary Examiner*—Chancellor E. Harris
*Attorneys*—Vernon A. Johnson and Thomas A. Lennon ABSTRACT: A device for moving the electric cord of an electric lawn mower from one side of the mower to the other which includes an elongate swingable arm which swings in a plane transverse to the direction of travel of the mower and which has the cord supported by the outer end thereof, said arm having a swingable handle attached thereto which also swings in a transverse plane and which is manipulatable by the operator to effect the swinging movement of the cord-carrying arm, the arm being of sufficient length so that it not only moves the cord from one side of the mower to the other, but also flips it aside a substantial distance ahead of the mower so that the entire path of the next swath to be cut is totally free of cord.

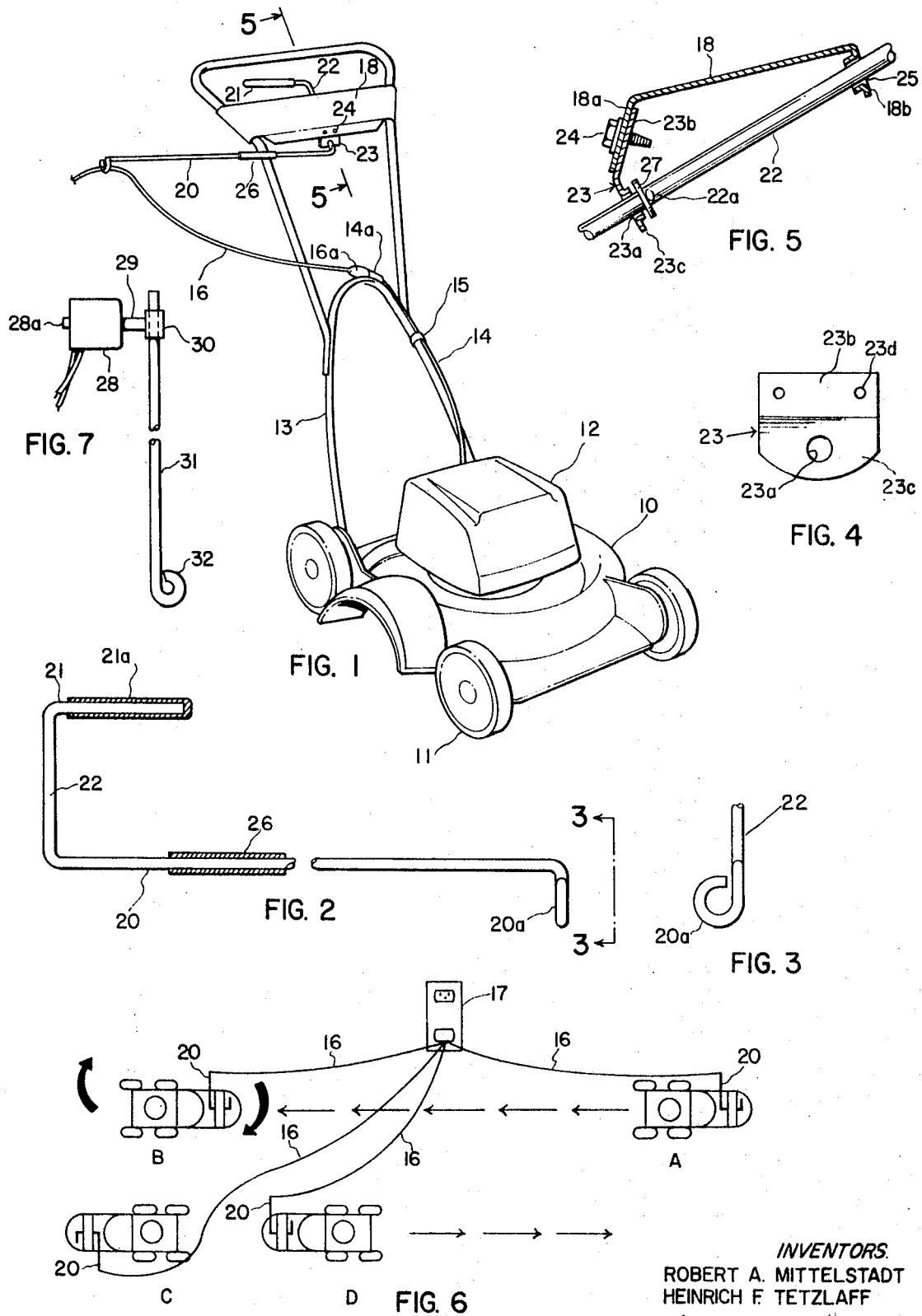

CORD CONTROL

Electric mowers, particularly those of the rotary type, have become increasingly popular. One of the major problems associated with electric mowers is the disposition and control of the cord during use, so that it will not become cumbersome to the operator and, more importantly, that it will not be run over and cut by the mower as it lays on the lawn during cutting. The safest and most desirable course of action is to be able to cut so that cord always extends from the mower side closest to the electrical outlet in which the cord is plugged in. However, the direction of travel must be reversed at the end of each pass which necessitates a complete turning around of the entire mower through a 180° turn so that the next pass can be made. If the mower is of the type in which the handle is fixed so that the mower housing is always moved in only one direction, then the cord ends up on the wrong side of the mower, and lies in the path of the mower, when the aforementioned reversal of direction takes place.

When the mower is turned around, the cord is on the side remote from the outlet and a substantial portion of the cord lies in the path of the mower. Therefore, the cord must be moved to the opposite side, that is the side closest to the outlet and the portion thereof lying in the path of the mower must be moved clear of said path before the operator can again begin mowing.

Therefore, an important object of this invention is to provide a device whereby the operator can easily and quickly move the cord to opposite sides of the mower.

Another important object is to provide a device for shifting the position of the cord from one side to the other of the mower which is also able to effectively flip the portion of the cord lying in the path of travel of the next cut entirely to the side of the mower closest to the outlet so that in a quick single simultaneous operational movement by the operator, the cord is completely reversed and cleared ahead of the mower so that the operator can safely and immediately resume cutting.

These and other objects will become apparent from the following description and drawings accompanying same in which:

FIG. 1 is a perspective view of a mower embodying the cord control of this invention;

FIG. 2 is a plan view of a rod-forming part of said cord control;

FIG. 3 is an end view of the rod of FIG. 2 as viewed along the line 3-3 of FIG. 2;

FIG. 4 is a front view of a bracket for supporting the rod of FIG. 2;

FIG. 5 is a cross-sectional view taken along the line 5-5 of FIG. 1;

FIG. 6 is a diagrammatic representation of a typical mowing pattern and cord control positioning at various phases thereof; and FIG. 7 illustrates an alternate form of this invention.

The mower of FIG. 1 includes a housing 10 which encloses a cutter blade (not shown), wheels 11, a shroud 12 which covers an electric motor (not shown), and a steering handle 13. An electric cord 14 extends rearwardly and upwardly from the electric motor and is attached to the lower handle portion by means of clips 15, the upper end of the cord being provided with a plug 14a.

Another electric cord 16 is connected to the cord 14 by means of plug connection 16a and extends therefrom to the house outlet 17 shown in FIG. 6. It is this length of electrical cord 16 which must be controlled, moved, and kept out of the path of the mower during use.

An escutcheon plate or control panel 18 is mounted on the upper end portion of the mower handle.

Mounted on the control panel 18 is the cord control mechanism of this invention. This mechanism includes an elongate cord-carrying and moving arm or rod 20 having a looped cord-supporting outer end portion 20a offset at right angles thereto. To operate the rod 20, handle 21 covered by a grip sleeve 21a is provided, which handle 21 is operatively rigidly connected to the rod 20 by means of an elongate shank or spindle 22 which is rotatable about its longitudinal axis.

The rod 20, rod handle 21, and spindle 22 are preferably integrally formed from a single length of rod stock suitably bent and deformed to form the described portions and in the illustrated embodiment lie in a common plane, with the handle 21 and rod 20 parallel to each other and perpendicular to the spindle 22. A bumper sleeve 26 is provided on the rod 20 at the point where the rod encounters the steering handle 13. The bumper sleeve 26 and handle grip 21a are formed of any suitable nonmetallic material, such as plastic or rubber. A washer 27 is mounted on the spindle 22 and interposed between the bracket 23 and projections 22a extending laterally from the spindle, which projections limit the downward movement of the spindle and maintain the rod handle 21 in spaced relationship from the back of the control panel a sufficient distance to enable the operator's hand to grip the handle without encountering the control panel.

The bracket 23 has a flat upper portion 23b and a flat lower portion 23c which are angularly offset from each other so that the opening 23a will be in proper alignment and substantially parallel relationship with opening 25 when the bracket is mounted on the control panel. The upper bracket portion 23b is provided with a pair of openings 23d for receiving the screw fasteners 24.

Thus, the control rod and mounting means therefor are so designed that the rod can be shipped from the manufacturer disassembled from the mower, and quickly and easily mounted at the point of retail sale or use. Thus, the bracket 23 is slipped on the rod, the rod is installed in opening 25 of the control panel, and the bracket is fastened to the front of the control panel by the screws 24, and the mounting is completed.

This control mechanism is mounted on the control panel 18 in the following manner. The control panel 18 has a depending front flange 18a and a depending back flange 18b. A bracket 23 having an opening 23a therein is mounted on the front flange 18a by suitable fastening means such as a pair of screws 24. The back flange 18b has an opening 25 therein which is in alignment with the opening 23a, the shank or spindle 22 being rotatably installed in the openings 23a and 25 and supported by the bracket 23 and back flange 18b, respectively. The cord 16 may be supported in any suitable manner from the rod 20, such as by inserting it through the loop 20a.

It will be noted that the grip or rod handle 21 is located where it can be conveniently reached and gripped by the operator while standing in the normal operating position behind the mower handle 13.

The rod 20 is preferably of sufficient length so that the outer end thereof is positioned laterally outwardly of the widthwise limits of the mower on both sides of the mower when the rod comes to rest on either side of the mower. The rod 20 must also be of sufficient length so that it can flip or move the cord aside a substantial distance ahead of the mower, preferably for as much as 40 feet ahead of the mower, since the cord oftentimes lies in the path of the mower for that distance. Experimentation has established that the rod should be at least 18 inches long to achieve the desired cord flipping distance ahead of the mower.

To move the cord from one side to the other, the operator simply grasps the rod handle 21 and quickly swings it to the opposite side. The faster he swings it, the greater the flipping force on the cord, and the operator soon becomes accustomed to the speed at which he must swing the handle to move the cord out of the path of the mower.

FIG. 6 illustrates a preferred pattern or manner of mowing with an electric mower and the manner in which the cord control of this invention functions. When mowing a lawn with an electric mower, it is preferable to begin with the area closest to the outlet and gradually move away from the outlet in the manner illustrated in FIG. 6, cutting back and forth in parallel juxtaposed swaths or paths of travel. In FIG. 6 the first pass is made from right to left with the rod 20 extending to the right side of the mower and with the cord being carried on the right side of the mower, with the mower moving from position A to position B. Thus, at the end of the first pass, the mower is in the position B illustrated in FIG. 6. The operator then turns the mower by moving clockwise or to his left in the direction of the arrows and away from the cord so as to reverse his position to that of position C and he will then be facing in the opposite direction and ready to begin the next pass or swath immediately adjacent the one previously cut. When he completes the move from position B to position C, the cord control rod is still extending from the right side of the mower and the cord angles from the cord control rod towards the outlet across the front of the mower and directly in the path thereof as illustrated. Thus, before the operator can continue cutting in the second pass, he must move the cord out of the way of the mower and to the left side thereof. This he accomplishes by gripping the handle 21 and flipping same to the left. By flipping the handle 21 with a reasonable speed and effort generally capable of being exerted by anyone capable of operating a lawn mower, enough momentum or whip is provided to the cord to enable it to be moved well to the left of the mower and the next swath to be cut for a considerable distance (up to 40 feet) ahead of the mower. This clears the entire uncut swath immediately ahead of the mower of the electric cord and enables the operator to continue his cutting without fear of running over the cord. Having completed the flipping of the cord, the mower, cord control, and cord assume the relative positions shown in position D of FIG. 6. For convenience of illustration, position D is shown forwardly of position C. However, it will be understood that at the start of the second pass, after the cord flipping is completed, the mower is located at C, but the control rod and cord are to the left of the mower, and out of the path of travel, as shown in position D.

Although the aforementioned minimum rod length of 18 inches is deemed most desirable for the type of cord presently available, shorter rods down to 14 inches in length can be used, where the rod is to be manually operated. Manually operated rods below 14 inches in length are considered undesirable for achieving the desired cord-flipping action.

FIG. 7 illustrates a powerized version of this invention. In this version, a rotary solenoid motor 28 having an operating button 28a is provided. The solenoid drives a rotatable shaft 29 to which a rod-supporting head 30 is attached. A cord-supporting and flipping rod 31 is attached to head 30 transversely of shaft 29, said rod having a cord-carrying and supporting loop 32 formed on the outer end thereof.

Thus, actuation of the solenoid causes rotation of shaft 29, which in turn swings rod 31 from side to side, and causes flipping of the cord from side to side and out of the path of travel of the mower in the manner hereinbefore described.

The motor and rod are preferably mounted on the upper end of the steering handle within reach of the operator, as in the earlier described version, and may be mounted on the illustrated escutcheon plate if desired.

It will, of course, be understood that various changes may be made in the form, details, arrangement and proportions of the various parts without departing from the scope of this invention.

What I claim is:

1. Cord control mechanism for an electrically powered ground traversing implement connected to an electrical outlet by a flexible electrical cord, said mechanism comprising:

a cord-supporting elongate rod pivotally mounted on said implement for swinging movement of said rod in a plane generally transverse to the direction of travel of said implement, said rod being movable between two positions in one of which said cord is disposed on one side of said implement and in the other of which the cord is disposed on the other side of said implement, and manually operable movable handle means operatively connected with and spaced from said rod, the movement of said handle effecting movement of said rod between said two positions, a shaft oriented in the direction of travel and rotatable about its longitudinal axis, one end of said shaft being operatively connected to the inner end of said rod to effect swinging movement of said rod in response to rotation of said shaft, the other end of said shaft being operatively connected to said handle, a steering handle for said implement behind which the operator stands in normal implement operating position, a panel mounted on said steering handle, said panel having depending front and back flanges extending transversely of said handle, an opening in said rear flange, a bracket removable fastened to said front flange, and depending therefrom, said bracket having an opening therein aligned with the opening in the rear flange, said shaft extending through both of said openings and being rotatably supported by the structure defining said openings.

2. Cord control mechanism for an electrically powered ground traversing implement having a steering handle which extends upwardly and rearwardly from said implement, said implement being connected to an electrical outlet by a flexible electric cord, said mechanism comprising:

a cord-supporting elongate rod which is pivotally mounted on said implement for swinging movement of said rod in a plane generally transverse to the direction of travel of said implement whereby said rod is movable between two positions in one of which said cord is disposed on one side of said implement and the other of which the cord is disposed on the other side of said implement, the cord-supporting portion of said rod when in each of said positions lying in a horizontal plane which intersects the upper half of said steering handle, including a panel mounted on said steering handle, said panel having depending front and back flanges extending transversely of said steering handle, openings in each of said flanges, said openings being in alignment with each other, a shaft oriented in the direction of travel and installed in said openings for rotation about its longitudinal axis, said rod being attached to the front end portion of said shaft in substantially perpendicular relationship thereto, and a manually operable rod-actuating handle attached to the back end portion of said shaft in substantially perpendicular relationship thereto.